(12) United States Patent
Smith

(10) Patent No.: US 12,023,969 B2
(45) Date of Patent: Jul. 2, 2024

(54) TIRE PRESSURE MONITORING SYSTEM

(71) Applicant: Sensata Technologies, Inc., Attleboro, MA (US)

(72) Inventor: Gary Smith, Attleboro, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 18/001,424

(22) PCT Filed: Jun. 15, 2020

(86) PCT No.: PCT/US2020/037727
§ 371 (c)(1),
(2) Date: Dec. 9, 2022

(87) PCT Pub. No.: WO2021/257051
PCT Pub. Date: Dec. 23, 2021

(65) Prior Publication Data
US 2023/0234407 A1    Jul. 27, 2023

(51) Int. Cl.
*B60C 23/04*    (2006.01)

(52) U.S. Cl.
CPC ................ *B60C 23/0474* (2013.01)

(58) Field of Classification Search
CPC ............ B60C 23/0474; B60C 23/0488; B60C 23/0489
USPC ........................................ 340/442
See application file for complete search history.

(56) References Cited

U.S. PATENT DOCUMENTS

| 4,067,235 | A | 1/1978 | Markland et al. |
| 6,369,712 | B2 * | 4/2002 | Letkomiller ........ B60C 23/0408 340/447 |
| 2005/0013444 | A1 | 6/2005 | Park et al. |
| 2005/0134444 | A1 * | 6/2005 | Park .................... B60C 23/0411 73/146 |

(Continued)

FOREIGN PATENT DOCUMENTS

| EP | 3366499 B1 | 1/2020 |
| FR | 3071607 A1 | 3/2019 |

OTHER PUBLICATIONS

International Search Report and Written Opinion dated Sep. 2, 2020 in related International Application No. PCT/US2020/037727.

(Continued)

*Primary Examiner* — Eric Blount
(74) *Attorney, Agent, or Firm* — Mark H. Whittenberger; Holland & Knight LLP

(57) ABSTRACT

The present disclosure relates to a system and method for a tire pressure monitoring system. Embodiments may include receiving and storing an input signal in a memory; receiving a digital signal from the memory at a digital signal processor, wherein the digital signal processor includes a plurality of selectable filters; filtering the digital signal through the plurality of selectable filters, wherein filtering the digital signal generates a forward-filtered digital signal; storing the forward-filtered digital signal in the memory; reversing the forward-filtered digital signal, wherein reversing the forward-filtered digital signal generates a reverse-filtered digital signal; and filtering the reverse-filtered digital signal through the plurality of selectable filters, wherein filtering the reverse-filtered digital signal generates a processed signal.

20 Claims, 11 Drawing Sheets

(56) References Cited

U.S. PATENT DOCUMENTS

2005/0179530 A1     8/2005   Stewart et al.
2012/0025359 A1    10/2012   Fink

OTHER PUBLICATIONS

Supplementary European Search Report and Search Opinion issued in related Application Serial No. 20941033.1 on Jan. 26, 2024.

\* cited by examiner

TIRE PRESSURE MONITORING SYSTEM

RELATED APPLICATIONS

The subject application is a U.S. National Stage application of International Application No. PCT/US2020/037727, filed on Jun. 15, 2020. The contents of which are herein incorporated by reference in their entirety.

TECHNICAL FIELD

The present disclosure generally applies to monitoring systems, more specifically a system and method for a tire pressure monitoring system.

BACKGROUND

Tire pressure monitoring systems ("TPMS") are electrical systems designed to monitor the air pressure inside the tires of vehicles. These systems generally operate in real-time periodically measuring tire pressure to help avoid traffic accidents, poor fuel economy, and improve wear on the tires. Numerous countries around the world mandate these systems in vehicles because of their effectiveness in creating a safer driving environment.

A TPMS is generally located inside the tire without direct electrical power. Therefore, any TPMS may need to be battery operated. When a battery dies the vehicle operator typically needs to undergo a time-consuming process of removing the wheel and the tire to access the TPMS. In commercial vehicles this can mean a direct loss of money while the TPMS is fully replaced or the battery is replaced. There is a continual need in the TPMS market for increasing the life of the system to reduce down time and increase the effectiveness of this important safety system.

A TPMS may require accurate measurement of the relative position of a vehicle wheel. The TPMS may monitor a signal form a sensor but this signal will be contaminated with road noise. Traditional analog filters may be used to lessen the impact of the noise but these analog filters are large, increase phase distortion and require a substantial amount of energy.

SUMMARY OF THE DISCLOSURE

As will be discussed in greater detail below, embodiments of the present disclosure include a tire pressure monitoring system.

In one or more embodiments of the present disclosure, a method associated with a tire pressure monitoring system ("TPMS") is included. The method may include receiving an input signal at an amplifier. The method may also include generating a first output at the amplifier, wherein the first output has a higher signal level than a signal level of the input signal. The method may further include receiving the first output at a filter. The method may also include generating a second output at the filter. The method may further include receiving the second output at an analog-to-digital converter. The method may also include generating a third output at the analog-to-digital converter. The method may further include storing the third output in a memory. The method may also include receiving a digital signal from the memory at a digital signal processor, wherein the digital signal processor includes a plurality of selectable filters. The method may further include filtering the digital signal through the plurality of selectable filters, wherein filtering the digital signal generates a forward-filtered digital signal. The method may also include storing the forward-filtered digital signal in the memory. The method may further include reversing the forward-filtered digital signal, wherein reversing the forward-filtered digital signal generates a reverse-filtered digital signal. The method may also include filtering the reverse-filtered digital signal through the plurality of selectable filters, wherein filtering the reverse-filtered digital signal generates a processed signal.

One or more of the following features may be included. In some embodiments, the input signal may be transmitted periodically from a source for a transmission time. The method may include disabling the amplifier, the filter, and the analog-to-digital converter after the transmission time of the input signal and after the third output is stored in the memory. In some embodiments, the plurality of selectable filters may also include an infinite impulse response filter. In some embodiments, the method may further include reprocessing the processed signal. Reprocessing the processed signal may include filtering the processed signal through a plurality of selectable filters, wherein filtering the processed signal may generate a second forward-filtered digital signal. Reprocessing the processed signal may further include storing the second forward-filtered digital signal in the memory. Reprocessing the processed signal may also include reversing the second forward-filtered digital signal, wherein reversing the second forward-filtered digital signal may generate a second reverse-filtered digital signal. Reprocessing the processed signal may further include filtering the second reverse-filtered digital signal through the plurality of selectable filters, wherein filtering the second reverse-filtered digital signal may generates a reprocessed signal. The method may also include recursively repeating the reprocessing step, wherein the recursively repeating the reprocessing step may use the reprocessed signal as the processed signal in the filtering the processed signal step. The method may further include recursively repeating the reprocessing step until a phase of the reprocessed signal is equal to a phase of the digital signal. Some embodiments may include minimizing a filter settling time of the processed signal. Minimizing the filter settling time may include measuring a phase shift between the forward-filtered digital signal and the reversed-filtered digital signal. Minimizing the filter settling time may also include measuring a minimum Z register value and a maximum Z register value in the forward-filtered digital signal. Minimizing the filter settling time may further include correcting the processed signal based on at least the minimum Z register value and the maximum Z register value. Minimizing the filter settling time may also include calculating Z delay register values from the minimum Z register value and the maximum Z register value. Minimizing the filter settling time may further include utilizing the Z delay register values in the infinite impulse response filter before filtering the reverse-filtered digital signal through the plurality of selectable filters. Minimizing the filter settling time may also include applying a phase offset to a starting location of the filtering of the reversed-filtered digital signal.

In one or more embodiments of the present disclosure, a TPMS system is provided. The system may include an amplifier, the amplifier may be configured to receive an input signal and may generate a first output, wherein the first output may include a higher signal level than a signal level of the input signal. A filter may be configured to receive the first output and generate a second output. An analog-to-digital converter may be configured to receive the second output and generate a third output. A memory may be configured to receive the third output, store the third output, and generate a digital signal. A digital signal processor may be configured to receive the digital signal and filter the digital signal through a plurality of selectable filters to generate a forward-filtered digital signal. The digital signal processor may also be configured to store the forward-filtered digital signal in the memory. The digital signal processor may be further configured to reverse the forward-filtered digital signal to generate a reverse-filtered digital signal. The digital signal processor may be also configured to filter the reverse-filtered digital signal through the plurality of selectable filters, and filter the reverse-filtered digital signal to generate a processed signal.

One or more of the following features may be included. In some embodiments, the input signal may be transmitted periodically from a source for a transmission time. In some embodiments, the amplifier, the filter, and the analog-to-digital converter are configured to be disabled after the transmission time of the input signal and after the third output is stored in the memory. In some embodiments, the plurality of selectable filters may include an infinite impulse response filter. The digital signal processor may be configured to reprocess the processed signal. The digital signal processor may be configured to minimize a filter settling time of the processed signal. The digital signal processor may be configured to measure properties of the digital signal and correct the infinite impulse response filter with at least Z delay register values before the reverse-filtered digital signal is filtered through the plurality of selectable filters calculate, wherein the Z delay register values includes a minimum Z register value and a maximum Z register value. The digital signal processor may be configured to apply a phase offset to a starting location of the reversed-filtered digital signal.

In one or more embodiments of the present disclosure, a method associated with a tire pressure monitoring system ("TPMS") is included. The method may include receiving an input signal. The method may also include storing the input signal in a memory. The method may also include receiving a digital signal from the memory at a digital signal processor. In some embodiments, the digital signal processor may include a plurality of selectable filters. The method may further include filtering the digital signal through a plurality of selectable filters. In some embodiments filtering the digital signal may generate a processed signal. The method may further include minimizing a filter settling time of the processed signal.

One or more of the following features may be included. In some embodiments, minimizing the filter settling time of the processed signal may include measuring a phase shift between a forward-filtered digital signal and a reversed-filtered digital signal. Minimizing the filter settling time of the processed signal may also include measuring a minimum Z register value and a maximum Z register value in the forward-filtered digital signal. Minimizing the filter settling time of the processed signal may further include correcting the processed signal based on at least the minimum Z register value, the maximum Z register value, and the phase shift.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Figure 1:
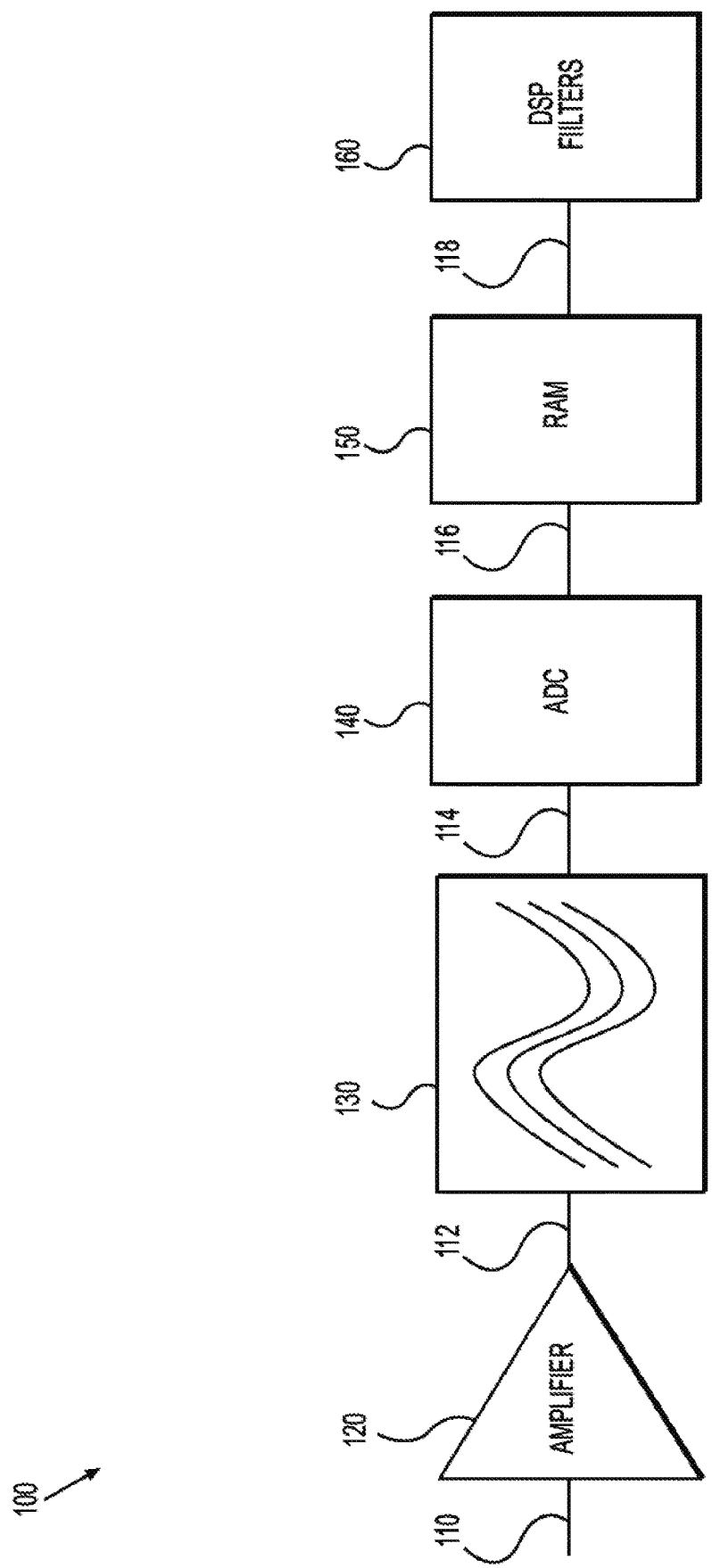
FIG. 1 illustrates a block diagram of an embodiment of the present disclosure.

Referring now to FIG. 1, an embodiment consistent with the present disclosure showing a tire pressure monitoring system ("TPMS") 100 is provided. TPMS 100 may include, an input signal 110, an amplifier 120, a first output signal 112, a filter 130, a second output signal 114, an analog-to-digital converter 140, a third output signal 116, a memory 150, a digital signal 118, and a digital signal processor 160. TPMS 100 represents one possible arrangement of the interconnectedness of these components though it should be noted that other arrangements are also within the scope of the present disclosure.

In some embodiments, input signal 110 may have a 10 Hz signal. This particular frequency is used merely by way of example as any low frequency signal may be used. Accordingly, the phrase "low frequency", as used herein, may refer to any frequencies within a range of 1-50 Hz. In other embodiments, the input signal 110 may be monitored for a specified time period and/or in a continuous manner.

In some embodiments, input signal 110 may include various types of information related to a wheel. The wheel may be a vehicle wheel but other wheels and/or tires requiring TPMS 100 may be used without departing from the scope of the present disclosure. The information may include, but is not limited to, a relative position of the wheel, the angle of the wheel and/or the rotation of the wheel, etc. In operation, while traveling on rough roads the input signal 110 may become contaminated with noise. For example, the input signal 110 may become corrupted with variable frequency content from the road or other surfaces related to the wheel. Since there is information related to the wheel included in input signal 110, embodiments of the present disclosure are configured to avoid introducing additional signal contamination.

In some embodiments, input signal 110 may be received at amplifier 120. Amplifier 120 may process the level of input signal 110 so that input signal 110 is at a suitable level to be processed by filter 130 and/or analog-to-digital converter 140. In other embodiments, more than one amplifier 120 may be used without departing from the scope of the present disclosure.

In some embodiments, amplifier 120 may be configured to generate a first output 112. Amplifier 120 may increase the signal level of first output 112 as compared to the signal level of input signal 110. In some embodiments, amplifier 120 may or may not operate continuously.

In some embodiments, and as shown in FIG. 1, first output 112 may be fed into filter 130. In some embodiments, filter 130 may be any suitable filter some of which may include, but are not limited to, an alias filter, an anti-aliasing filter, and/or a low-pass filter. In other embodiments, filter 130 may be configured to reduce the frequency contamination provided by the surface the wheel is riding on. Filter 130 may generate second output 114 as is discussed in further detail below.

In some embodiments, analog-to-digital converter 140 may be configured to receive second output 114 from filter 130. Analog-to-digital converter 140 may convert second output 114 into a digital format and generate third output 116. Input signal 110 may be an analog signal, and may remain as an analog signal while it passes through, and is conditioned by, amplifier 120 and filter 130 as first output 112 and second output 114 respectively. In some embodiments, analog-to-digital converter 140 may or may not operate continuously.

In some embodiments, memory 150 may be configured to receive third output 116 from analog-to-digital converter 140. Memory 150 may store third output 116 permanently or may store third output 116 until filtering operations in digital signal processor 160 are complete. Memory 150 may be any memory suitable to store third output 116 for reading and writing operations in digital signal processor 160. Some types of memory may include, but are not limited to, volatile memory such as dynamic random access memory or static random access memory (collectively "RAM"), nonvolatile memory such as flash memory, and any other suitable storage device. Memory 150 may be configured to generate digital signal 118 and/or may also be configured to receive digital signal 118 from digital signal processor 160.

In some embodiments, digital signal 118 may include a sample of input signal 110 or the entirety of input signal 110. In either case, input signal 110 may be digitized and conditioned by amplifier 120, filter 130, and analog-to-digital converter 140. In general, memory 150 may store third output 116 as data within it.

In some embodiments, once input signal 110 has been captured, conditioned, and stored in memory 150, then amplifier 120, filter 130, and/or analog-to-digital converter 140 may be turned off and/or disabled. In embodiments such as these, this operation may lead to energy consumption reductions because digital signal processor 160 and memory 150 may still perform their operations without the amplifier 120, filter 130, and/or analog-to-digital converter 140 once input signal 110 has been stored in memory 150. Accordingly, using the teachings of the present disclosure, embodiments may use approximately 10% of the energy of existing tire pressure monitoring systems.

Figure 6:
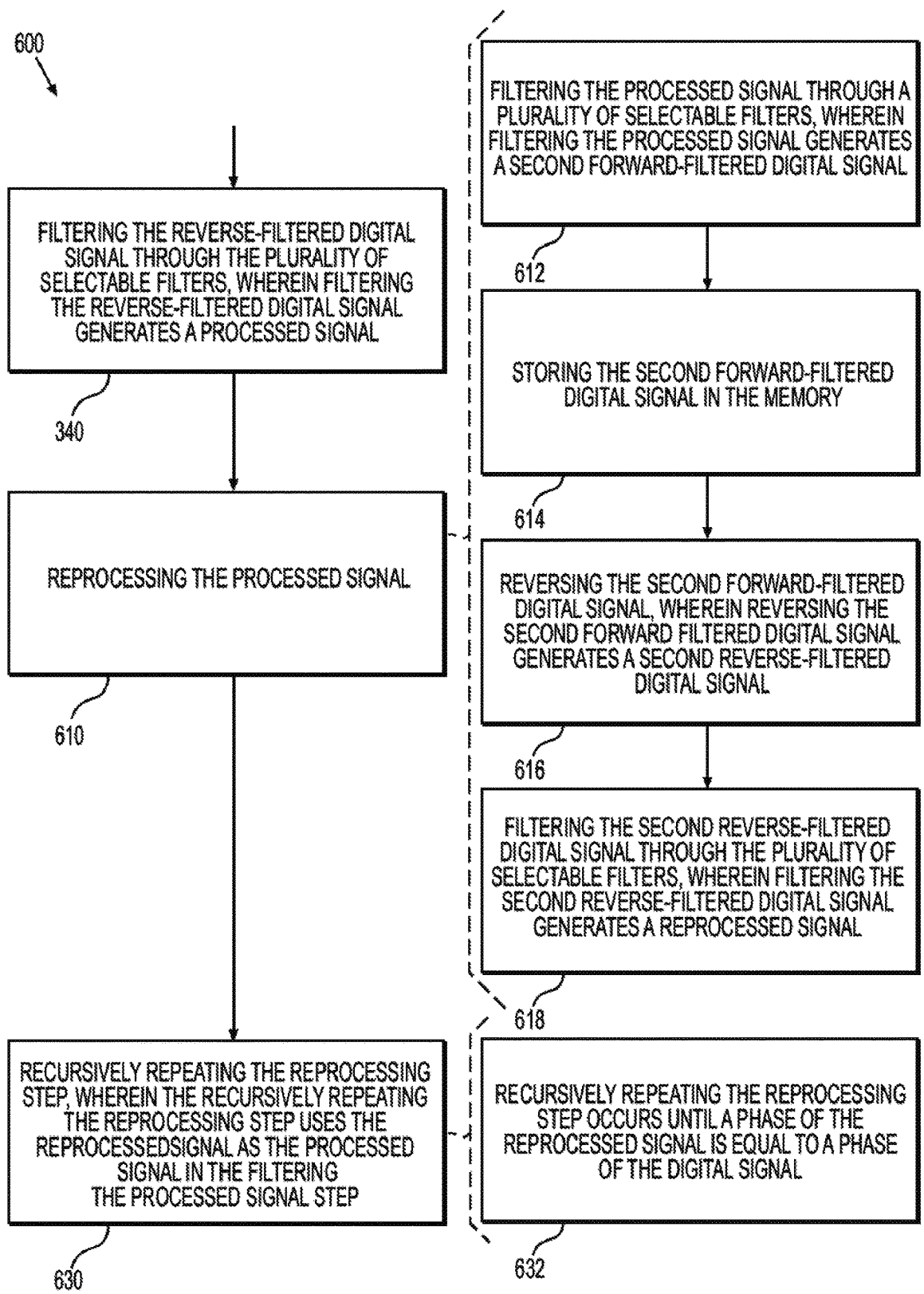
FIG. 6 illustrates a flowchart consistent with embodiments of the tire pressure monitoring system.
Figure 9:
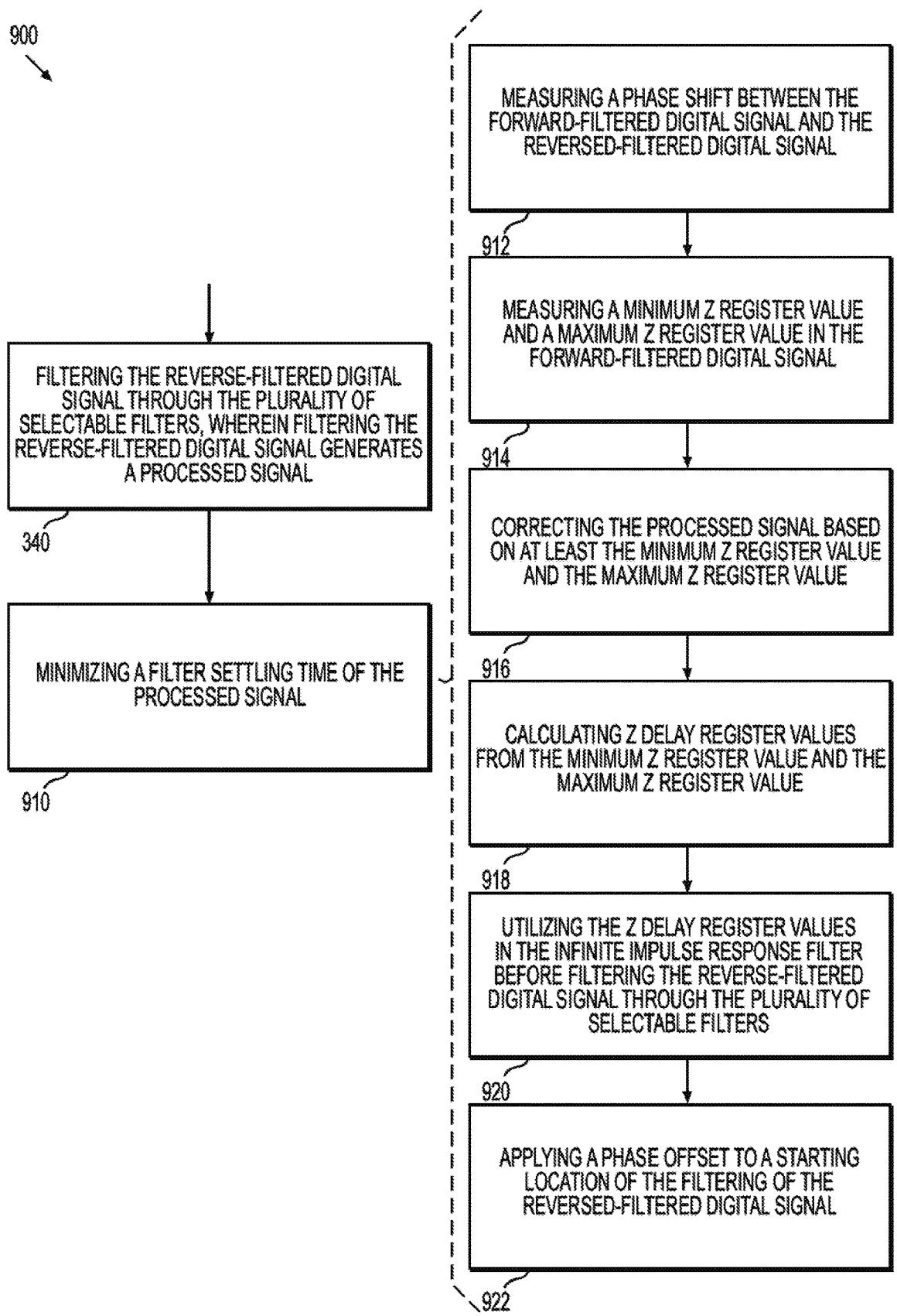
FIG. 9 illustrates a flowchart consistent with embodiments of the tire pressure monitoring system.

In some embodiments, digital signal processor 160 may be configured to receive digital signal 118. In some embodiments, digital signal processor 160 may send digital signal 118 back to memory 150 to be stored. Digital signal processor 160 may be configured to process digital signal 118, which may allow for information relating to the wheel to be extracted. In some embodiments digital signal processor 160 may include a filter or a plurality of filters. The plurality of filters may be different and/or selectable. Some examples of filters may include, but are not limited to, infinite impulse response filters, zero phase filters, forward-backward filters, and/or any combination thereof. Digital signal processor 160 may be configured to process digital signal 118 from memory 150 through the plurality of filters. In some embodiments, digital signal processor 160 may be configured to remove phase distortion of digital signal 118 created from the plurality of filters. In other embodiments, digital signal processor 160 may be configured to reprocess digital signal 118 recursively or for a set number of times. In other embodiments, digital signal processor 160 may be configured to minimize a filter settling time resulting from filtering operations. More details of processing operations are provided below in reference to the other figures. Specifically, FIG. 3, FIG. 6, and FIG. 9 depict flowcharts of embodiments consistent with the present disclosure showing various processing operations.

Figure 2:
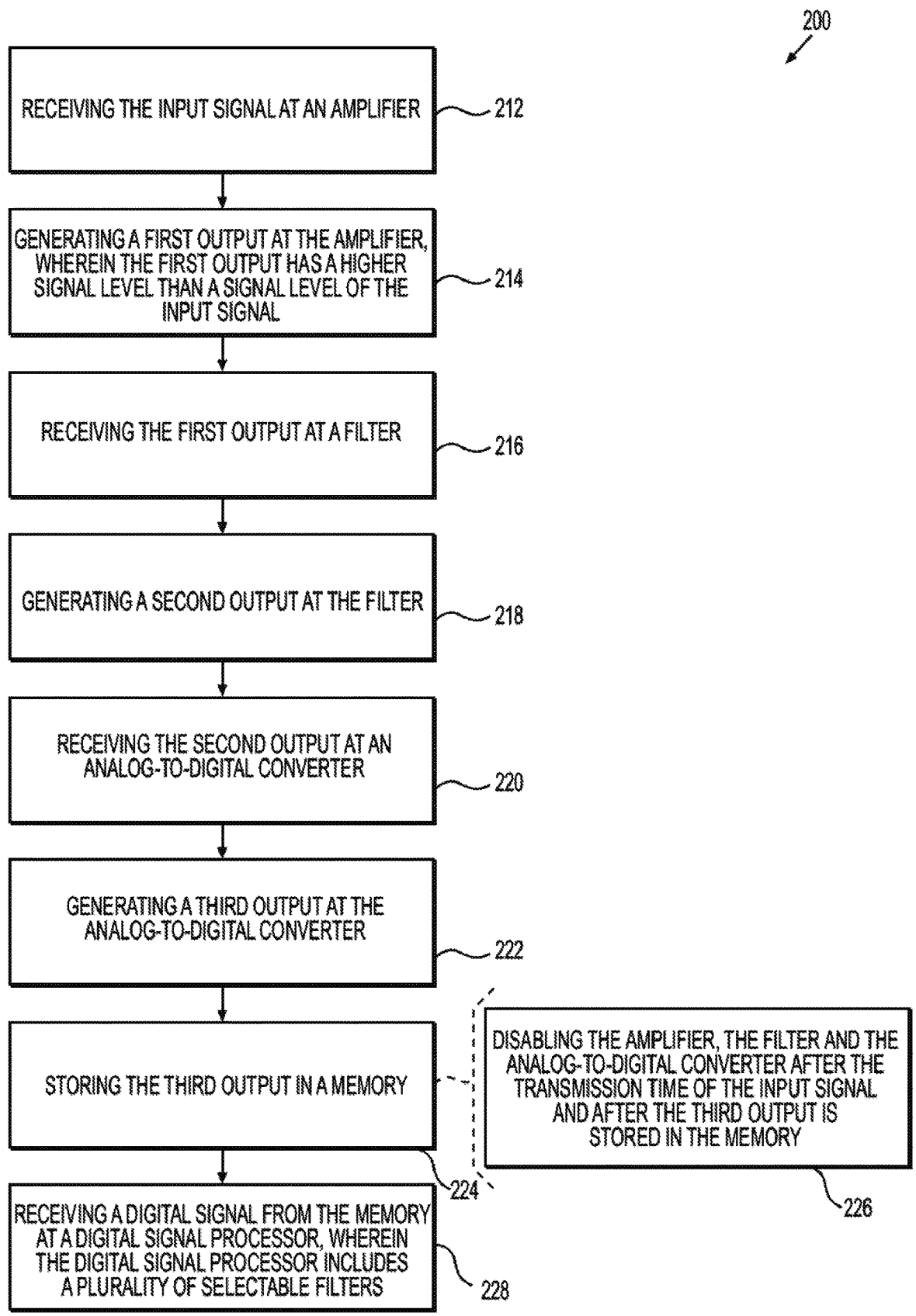
FIG. 2 illustrates a flowchart consistent with embodiments of the tire pressure monitoring system.

Referring now to FIG. 2, a flowchart 200 consistent with embodiments of TPMS 100 is provided. The method may include receiving (212) an input signal (e.g. input signal 110) at an amplifier (e.g. amplifier 120). The method may also include generating (214) a first output (e.g. first output 112) at the amplifier, wherein the first output has a higher signal level than a signal level of the input signal. The method may further include receiving (216) the first output at a filter (e.g. filter 130). The method may also include generating (218) a second output (e.g. second output 114) at the filter. The method may further include receiving (220) the second output at an analog-to-digital converter (e.g. analog-to-digital converter 140). The method may also include generating (222) a third output (e.g. third output 116) at the analog-to-digital converter. The method may further include storing (224) the third output in a memory (e.g. memory 150). The method may also include receiving (228) a digital signal (e.g. digital signal 118) from the memory at a digital signal processor (e.g. digital signal processor 160), wherein the digital signal processor includes a plurality of selectable filters.

In some embodiments of TPMS 100, the input signal may be transmitted periodically from a source for a transmission time. The method may include disabling (226) the amplifier, the filter, and the analog-to-digital converter after the transmission time of the input signal and after the third output is stored in the memory.

Figure 3:
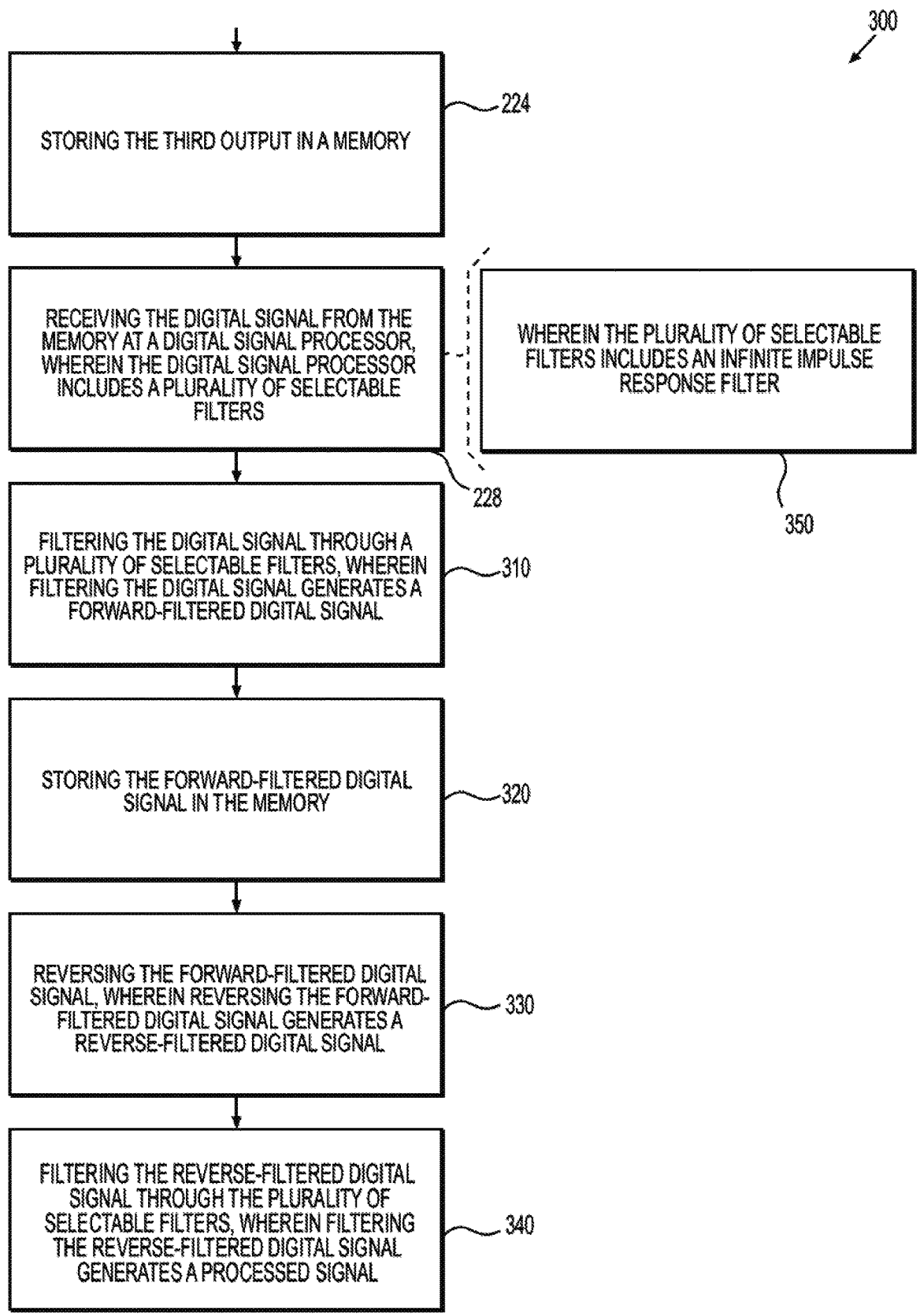
FIG. 3 illustrates a flowchart consistent with embodiments of the tire pressure monitoring system.

Referring now to FIG. 3, a flowchart 300 consistent with embodiments of TPMS 100 is provided. Flowchart 300 may include some or all of the steps in FIG. 2. Specifically, flowchart 300 beings with storing (224) the third output in a memory and receiving (228) a digital signal from the memory at a digital signal processor, wherein the digital signal processor includes a plurality of selectable filters. However, flowchart 300 provides additional details for receiving (228) a digital signal from the memory at a digital signal processor, wherein the digital signal processor includes a plurality of selectable filters.

In some embodiments, as depicted in FIG. 3, the method may further include filtering (310) the digital signal through the plurality of selectable filters, wherein filtering the digital signal generates a forward-filtered digital signal. The method may also include storing (320) the forward-filtered digital signal in the memory. The method may further include reversing (330) the forward-filtered digital signal, wherein reversing the forward-filtered digital signal generates a reverse-filtered digital signal. The method may also include filtering (340) the reverse-filtered digital signal through the plurality of selectable filters, wherein filtering the reverse-filtered digital signal generates a processed signal.

In some embodiments, filtering (310) the digital signal may occur while minimizing the phase distortion of the processed signal. In other embodiments, filtering (310) the digital signal may occur without introducing phase distortion in the processed signal. In some embodiments, filtering (310) the digital signal from the memory at the digital signal processor allows for a digital implementation without using excessive physical area (specifically, additional processing equipment is not required) and without using software correction techniques.

Figure 4:
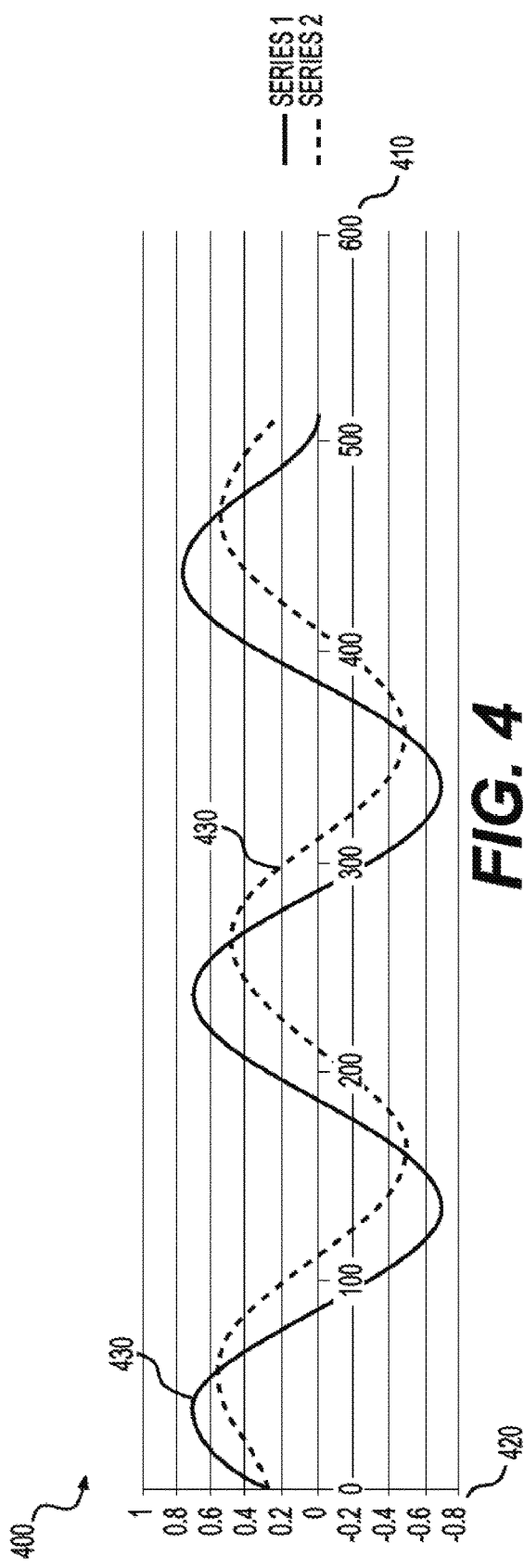
FIG. 4 illustrates a wave diagram showing phase distortion from filtering.

In some embodiments, filtering (310) the digital signal through the plurality of selectable filters, may include an infinite impulse response filter (350) within the plurality of selectable filters. In some embodiments, the plurality of selectable filters may cause a phase distortion in the digital signal during the first pass of a filter in the forward-filtered digital signal. The phase distortion may be a frequency dependent effect, however, embodiments of the present disclosure may still correct or eliminate the phase distortion. FIG. 4 provides an example showing phase distortion before and after filtering without using embodiments of the disclosure.

In some embodiments, processing the digital signal may further include reversing (330) the forward-filtered digital signal, wherein reversing the forward-filtered digital signal may generate a reverse-filtered digital signal. In some embodiments, reversing (330) may occur using software, hardware or combinations thereof. The phase distortion may be frequency dependent, and some embodiments may negate the frequency-dependent impact by reversing the forward-filtered digital signal. By reversing the forward-filtered digital signal, a reverse-filtered digital signal may be obtained.

In some embodiments, filtering (340) the reverse-filtered digital signal through the plurality of selectable filters may reverse the frequency-dependent impact of the plurality of selectable filters. In other embodiments, filtering (340) the reverse-filtered digital signal through the plurality of selectable filters may cancel out the frequency-dependent impact from the plurality of selectable filters, resulting in a zero phase distortion. Zero phase distortion means that after filtering (310) the digital signal, the phase of the filtered signal did not move, or moved zero samples.

For example, if after Signal A, having a frequency X, was passed through the plurality of selectable filters and it may be moved by +10 samples as compared to the input signal. Then, if Signal A was reversed, Reversed-Signal A will have moved −10 samples. Filtering Reversed-Signal A through the plurality of selectable filters will still cause a phase distortion, but Reversed-Signal A will move +10 samples, resulting in a distortion of zero samples in processed-Signal A (−10+10=0). This example is provided to illustrate one particular mechanism for filtering (310) the digital signal.

Referring now to FIG. 4, a wave diagram 400 showing phase distortion from filtering is provided. Wave diagram 400 includes an X axis representing a sample time 410, and a Y axis representing amplitude 420. Diagram 400 depicts an input wave 430 and a filtered output wave 440. It can be seen that filtering input wave 430 shifts the peaks of filtered output wave 440 and the resulting phase. In some embodiments, a filter such as an infinite impulse response filter may create a distortion similar to that shown in FIG. 4. In some embodiments of TPMS 100, this phase distortion may directly impact the information related to the wheel carried on the input wave, and in some situations may create undesirable false readings.

Figure 5:
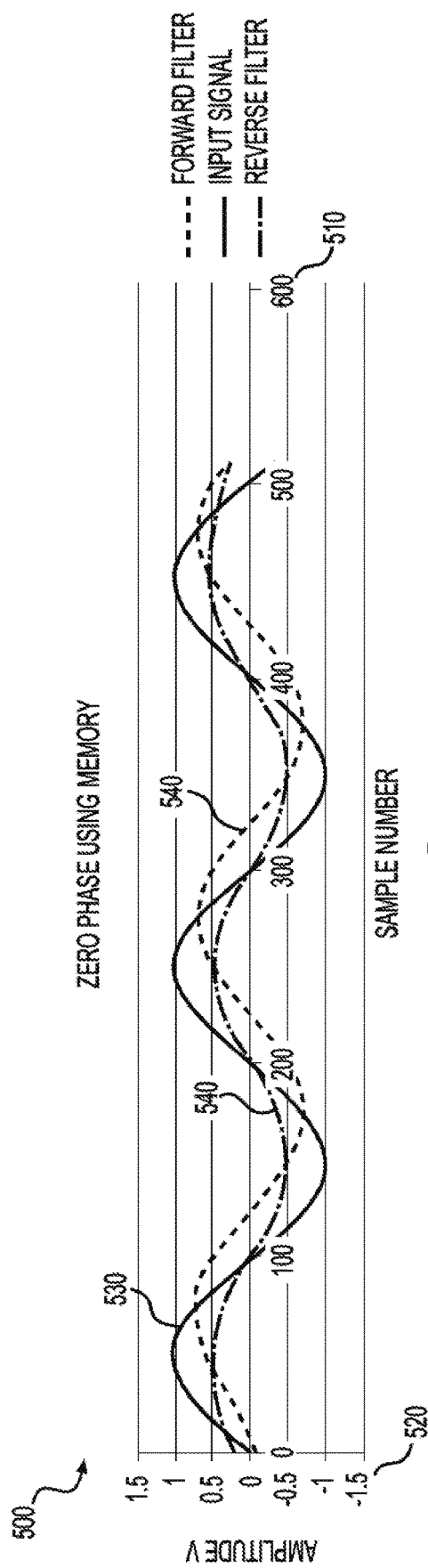
FIG. 5 illustrates a wave diagram showing phase distortion from a forward filter and a reverse filter.

Referring now to FIG. 5, a wave diagram 500 showing phase distortion from a forward filter and a reverse filter is provided. Diagram 500 includes an x axis representing sample time 510, and a y axis representing amplitude 520. Diagram 500 depicts an input wave 530, a forward-filtered output wave 540, and a reverse-filtered output wave 550. It can be seen that filtering input wave 530 shifts the peaks of forward-filtered output wave 540, like in FIG. 4. However, it can also be seen that in some embodiments, reverse filtering forward-filtered output wave 540 may result in a reverse-filtered output wave 550 with a zero distortion in the phase. In other words, input wave 530 and reverse-filtered output wave 550 may have a similar phase.

Wave diagram 500 illustrates a second order filter. In some embodiments, like in wave diagram 500, the zero phase distortion on reverse-filtered output wave 550 may be accompanied by a twice the amplitude reduction expected of a single order filter. A single order filter may correspond to a first pass through the plurality of selectable filters. In other embodiments, higher order filters may be necessary to process noisy input signals. In some embodiments, higher order filters include any even number of filters. Specifically second order, fourth order, sixth order, eighth order, and tenth order filters may all be used without departing from the scope of the present disclosure. Higher order filters may also be included within embodiments of this disclosure. Even numbers of filter orders may be employed so that the forward filter pass may be negated by the reverse filter pass.

Referring now to FIG. 6, a flowchart 600 consistent with embodiments of TPMS 100 is provided. Flowchart 600 may include some or all of the steps in FIG. 2 and/or FIG. 3. Specifically, flowchart 600 begins with filtering (340) the reverse-filtered digital signal through the plurality of selectable filters, wherein filtering the reverse-filtered digital signal generates the processed signal. Specifically, flowchart 600 includes reprocessing (610) the processed signal. Additionally, flowchart 600 include recursively repeating (630) the reprocessing step, wherein the recursively repeating the reprocessing step uses the reprocessed signal as the processed signal in the filtering the processed signal step. These steps may be included for higher order filtering operations.

In some embodiments, the method may further include reprocessing (610) the processed signal. Reprocessing (610) the processed signal may include filtering (612) the processed signal through a plurality of selectable filters, wherein filtering the processed signal may generate a second forward-filtered digital signal. Reprocessing (610) the processed signal may further include storing (614) the second forward-filtered digital signal in the memory. Reprocessing (610) the processed signal may also include reversing (616) the second forward-filtered digital signal, wherein reversing the second forward-filtered digital signal may generate a second reverse-filtered digital signal. Reprocessing (610) the processed signal may further include filtering (618) the second reverse-filtered digital signal through the plurality of selectable filters, wherein filtering the second reverse-filtered digital signal may generates a reprocessed signal. By repeating the forward and reverse filtering operations higher order filtering operations become possible.

In some embodiments, the method may also include recursively repeating (630) the reprocessing step, wherein the recursively repeating the reprocessing step may use the reprocessed signal as the processed signal in the filtering the processed signal step. In some embodiments, reprocessing can be recursive process where the final filtered signal from the previous operation is forward filtered and reverse filtered again. The method may further include recursively repeating the reprocessing step until a phase of the reprocessed signal is equal to a phase of the digital signal (632). In some embodiments, the recursive repeating can continue through higher order filtering operation until zero phase distortion occurs.

Figure 7:
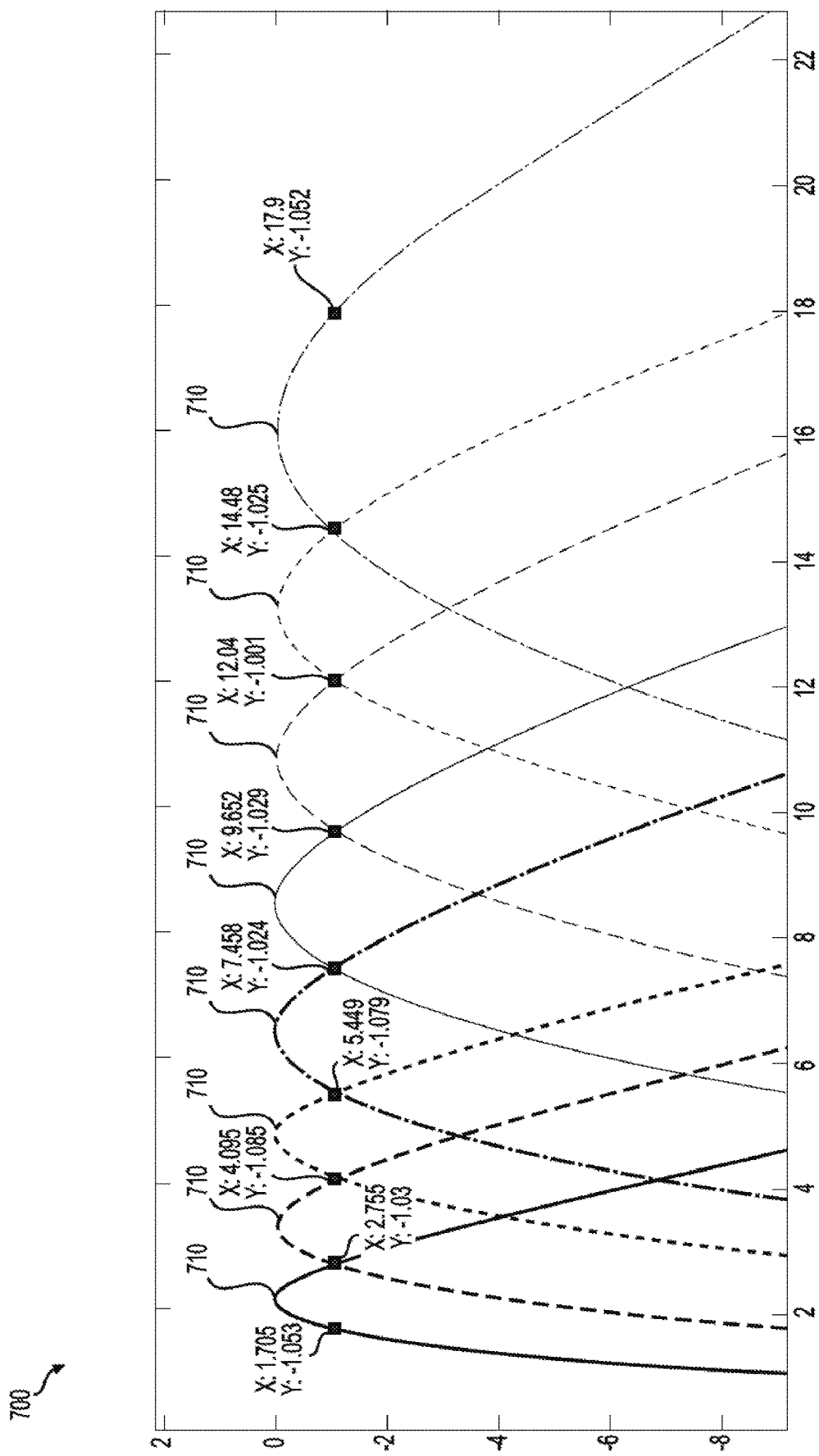
FIG. 7 illustrates a bandform diagram consistent with embodiments of the tire pressure monitoring system.

Referring now to FIG. 7, a bandform diagram 700 consistent with embodiments of the tire pressure monitoring system is provided. Bandform diagram 700 shows an example embodiment of an eighth order bandpass having eight of filter 710. As mentioned in reference to FIG. 5 and FIG. 6 other embodiments having a different number of filter passes are within the scope of the disclosure.

Figure 8:
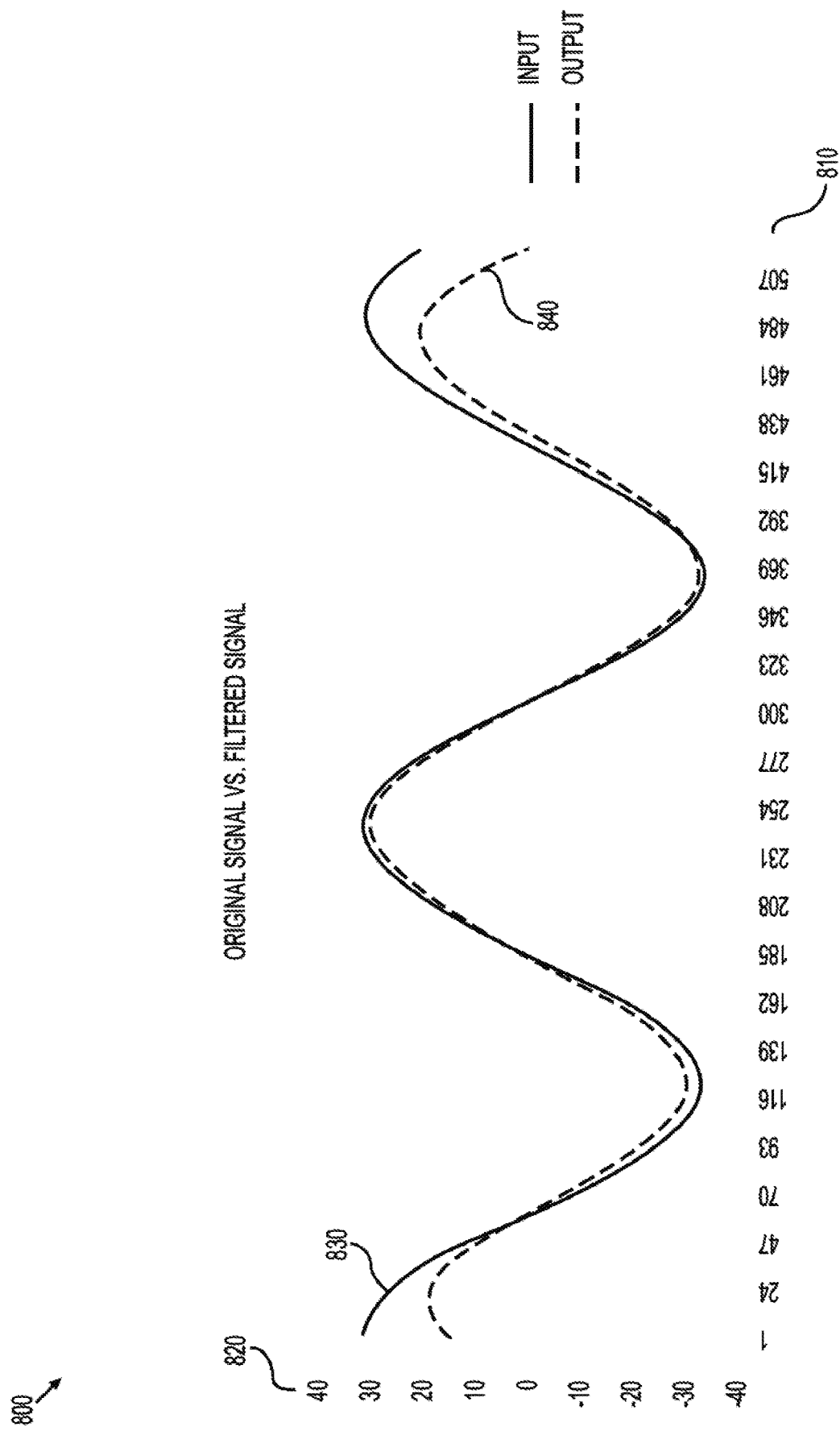
FIG. 8 illustrates a wave diagram showing digital filter settling after filtering.

Referring now to FIG. 8, wave diagram 800 shows digital filter settling after filtering. Wave diagram 800 includes an X axis representing sample time 810, and a Y axis representing amplitude 820. Plotted on wave diagram 800 is an input wave 830 and a filtered output wave 840. In some embodiments, after filtering forward and reverse there may be zero phase distortion but the signal may be affected by digital filter settling. In wave diagram 800, digital filter settling can be seen at both the start and the end of the sample. Specifically, filtered output wave 840 may not align at the beginning and end of the sample, and only match in the center of the sample. In some embodiments, data mismatch seen in wave diagram 800 may occur after infinite impulse response filtering in the forward direction and reverse direction at a given frequency.

Referring now to FIG. 9, a flowchart 900 consistent with embodiments of TPMS 100 is provided. Flowchart 900 continues the embodiment in FIG. 3, but may include some or all of the steps in FIG. 2, FIG. 3, and/or FIG. 6. Specifically, flowchart 600 begins with filtering (340) the reverse-filtered digital signal through the plurality of selectable filters, wherein filtering the reverse-filtered digital signal generates the processed signal. However, flowchart 900 shows an embodiment with additional operations. Specifically, flowchart 900 includes minimizing (910) a filter settling time of the processed signal.

In some embodiments, as depicted in FIG. 9, minimizing (910) the filter settling time may include measuring (912) a phase shift between the forward-filtered digital signal and the reversed-filtered digital signal. Minimizing (910) the filter settling time may also include measuring (914) a minimum Z register value and a maximum Z register value in the forward-filtered digital signal. Minimizing (910) the filter settling time may further include correcting (916) the processed signal based on at least the minimum Z register value and the maximum Z register value. Minimizing (910) the filter settling time may also include calculating (918) Z delay register values from the minimum Z register value and the maximum Z register value. Minimizing (910) the filter settling time may further include utilizing (920) the Z delay register values in the infinite impulse response filter before filtering the reverse-filtered digital signal through the plurality of selectable filters. Minimizing (910) the filter settling time may also include applying (922) a phase offset to a starting location of the filtering of the reversed-filtered digital signal.

In some embodiments, overcoming the settling time of the plurality of selectable filters may be accomplished by predicting the input waveform and to append this prediction to the sample being filtered. In some embodiments, the prediction would be filtered first and may be sufficiently long enough to for the filter to settle before the data of interest enters the filter.

In some embodiments, removing the settling time with no extra energy consumption may require knowledge of filter delay register values and phase shift of the signal. In some embodiments, measuring (912) the phase shift between the forward-filtered digital signal and the reversed-filtered digital signal, and measuring (914) the minimum Z register value and the maximum Z register value in the forward-filtered digital signal, may be necessary to correct the filter settling time. In some embodiments, the minimum Z register value and the maximum Z register value are collected when the sample is being run through the filter forward. In some embodiments, the minimum Z register value ("minZ") and the maximum Z register value ("maxZ") may be added together to obtain a mean. In some embodiments, Z delay registered values (Z1 and Z2) are obtained from the phase shifted location near the end of the sample. (Measuring these Z register values will also be discussed in connection with FIG. 10.) New Z delay register values are calculated by the following equations:

$$\text{mean} = \text{maxZ} + \text{minZ}$$

$$\text{newZ1} = -Z2 + \text{mean}$$

$$\text{newZ2} = -Z1 + \text{mean}$$

The calculated newZ1 and newZ2 values may be utilized in the Z delay registers before running the data backwards.

Figure 10:
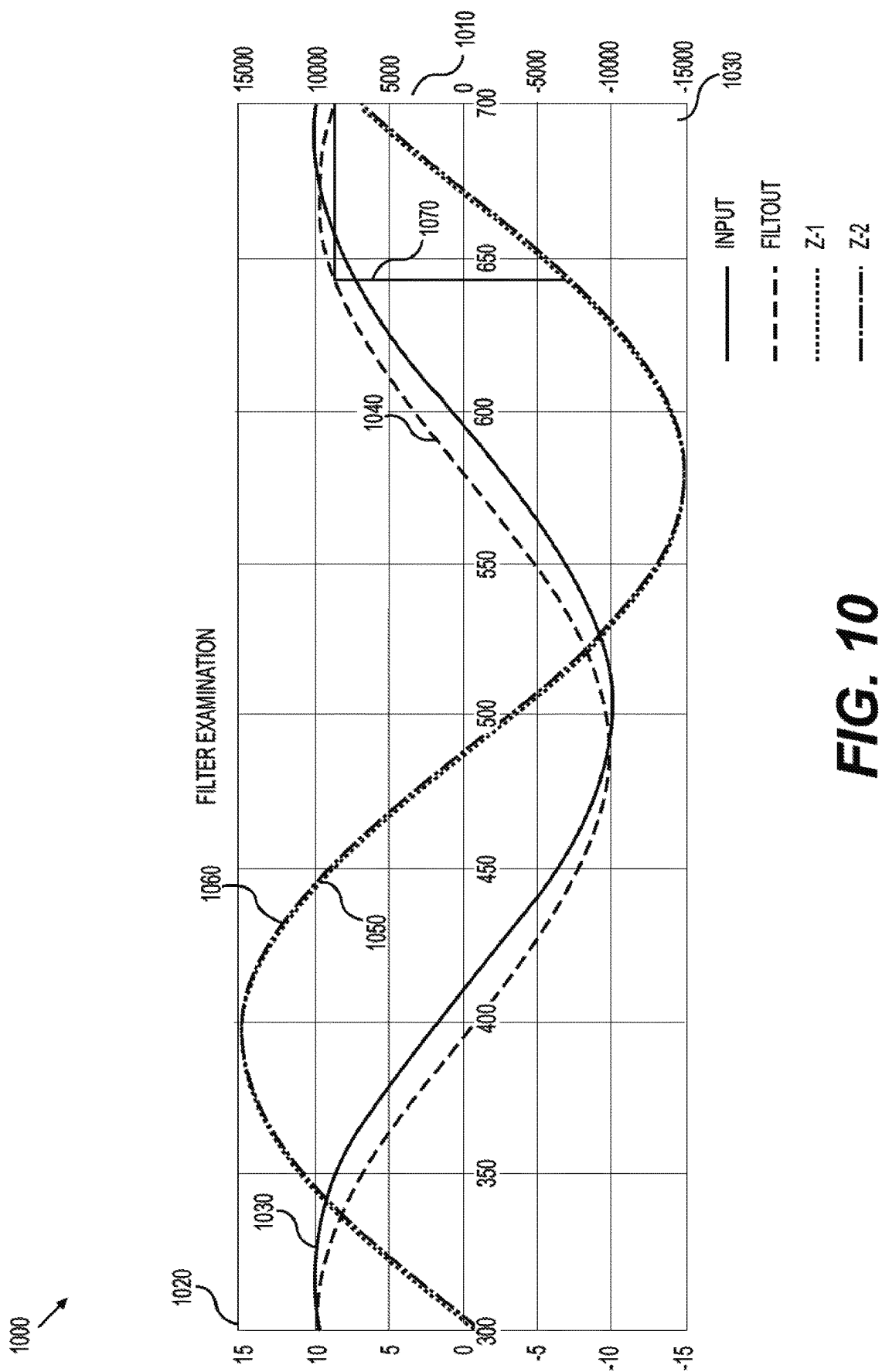
FIG. 10 illustrates a wave diagram and Z delay register values consistent with embodiments of the tire pressure monitoring system.

Referring now to FIG. 10, wave diagram 1000 and Z delay register values consistent with embodiments of the TPMS 100 is provided. Wave diagram 1000 includes an X axis representing sample time 1010, a Y axis representing amplitude 1020, and Z delay register values on the second Y axis. Diagram 1000 depicts an input wave 1030, a filtered output wave 1040, Z1 delay values 1050 and Z2 delay values 1060. In some embodiments, the final values of filter output wave 1040 may be used to find the appropriate Z delay register values for a signal that has equal but opposite gradient. Lines 1070 represent that the Z values are equal but opposite.

In some embodiments, using Z delay register values from the final filtered output wave 1040 value may not always have an average of zero. In some embodiments, it may be necessary to find the last maximum and minimum Z register value in the filtered output wave 1040. The sum of the maximum and minimum Z register values may be used as the mean for the Z register value to compute the Z values.

In some embodiments, correcting with Z delay values may replace the filter settling time with a phase shift from the input wave 1030. This issue will be discussed within the context of FIG. 11.

Figure 11:
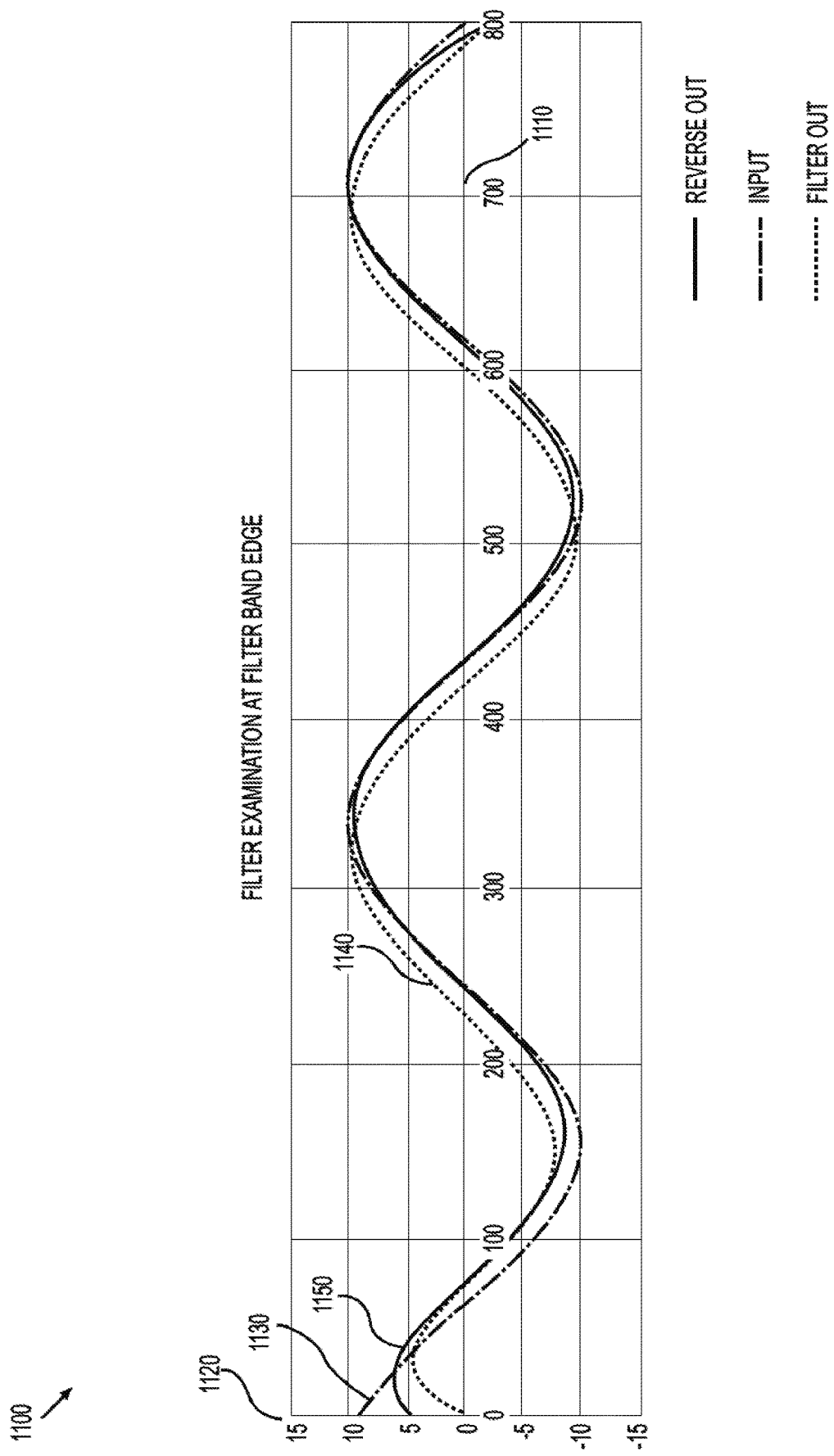
FIG. 11 illustrates a wave diagram showing filter errors at the start of a signal.

Referring now to FIG. 11, wave diagram 1100 shows filter error at the start of a signal consistent with TPMS 100. Wave diagram 1100 includes an X axis representing sample time 1110 and a Y axis representing amplitude 1120. Diagram 1100 depicts an input wave 1130, a filtered output wave 1140, and a reverse filtered output wave 1150.

In some embodiments, such as wave diagram 1100, once the correction using the Z register values is applied filter settling issues may no longer be present. Specifically, in wave diagram 1100 the correction may be only applied to the end of the sample. As a result the reverse filtered output wave 1150 and the filtered output wave 1140 may start at the same point but may no longer be in line with the input wave 1130. This may be corrected by measuring a known point in the waveform when filtering in one direction and the measure how much the point may move when filtering in the other direction. The offset between the known point in the different filtering directions may then be applied to the end of the sample by starting from a different sample location for processing. In other embodiments, the offset between the known point in the different filtering directions may then be applied to the end of the sample by taking the Z delay register value from a point earlier in the sample.

Figure 12:
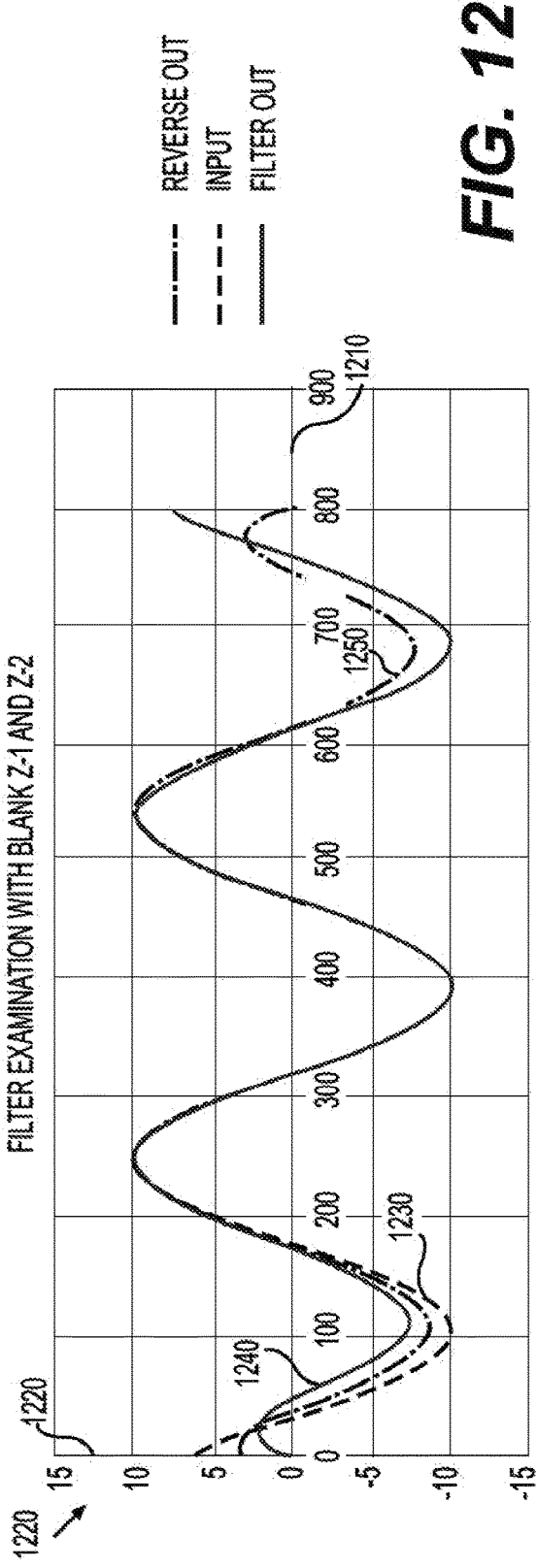
FIG. 12 illustrates a wave diagram showing a signal before filter settling correction.
Figure 13:
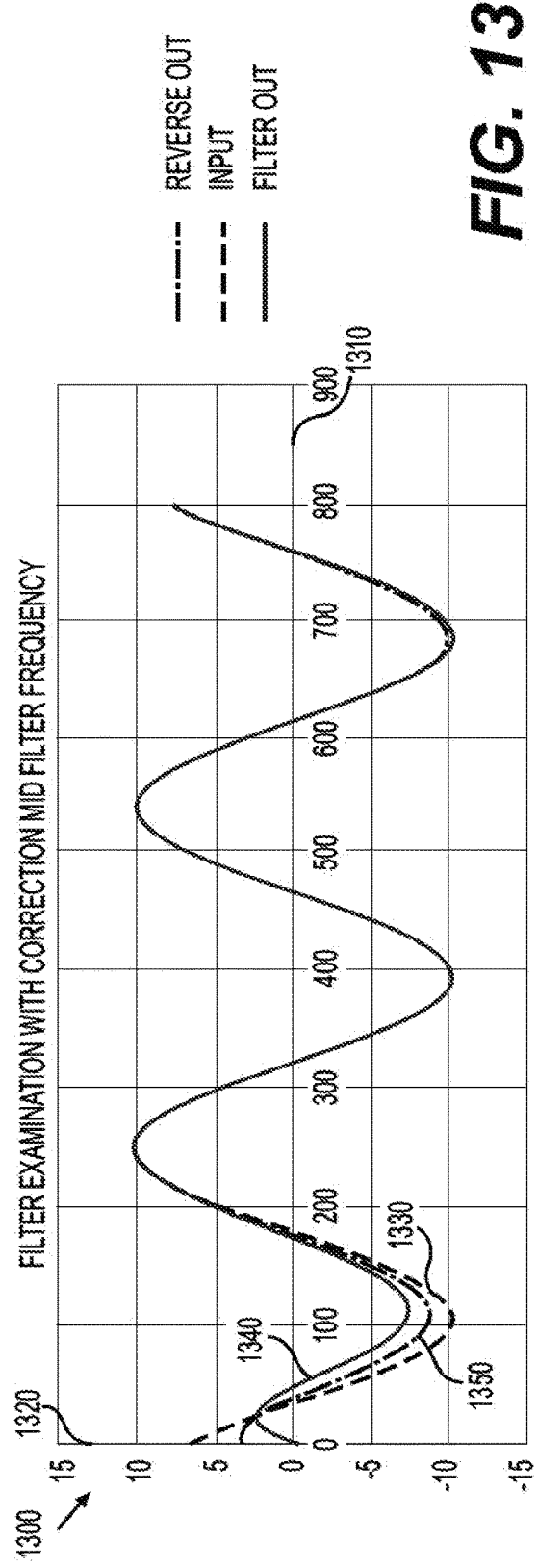
FIG. 13 illustrates a wave diagram showing a signal after filter settling correction.

Referring now to FIGS. 12 and 13, wave diagrams 1200 and 1300 respectively show a signal before and after filter settling corrections consistent with TPMS 100. Wave diagrams 1200 includes an X axis representing sample time 1210 and a Y axis representing amplitude 1220. Diagram 1200 depicts an input wave 1230, a filtered output wave 1240, and a reverse filtered output wave 1250. Diagram 1300 includes an X axis representing sample time 1310 and a Y axis representing amplitude 1320. Diagram 1300 depicts an input wave 1330, a filtered output wave 1340, and a reverse filtered output wave 1350. In some embodiments, like waveform 1200, without filter settling corrections the reverse output 1250 may not align with the input wave 1230 at the end of the sample. In other embodiments, like waveform 1300, a filter settling correction applied the reverse filtered output wave 1350 may align with the input wave 1330 at the end of the sample.

It can be seen in FIG. 12 and FIG. 13 that embodiments of the present disclosure increase the usable data in the sample. In some embodiments there may be an increase by 10%-20% of usable data As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method associated with a tire pressure monitoring system ("TPMS"), comprising:
    receiving an input signal at an amplifier;
    generating a first output at the amplifier, wherein the first output has a higher signal level than a signal level of the input signal;
    receiving the first output at a filter;
    generating a second output at the filter;
    receiving the second output at an analog-to-digital converter;
    generating a third output at the analog-to-digital converter;
    storing the third output in a memory;
    receiving a digital signal from the memory at a digital signal processor, wherein the digital signal processor includes a plurality of selectable filters;
    filtering the digital signal through the plurality of selectable filters, wherein filtering the digital signal generates a forward-filtered digital signal;
    storing the forward-filtered digital signal in the memory;
    reversing the forward-filtered digital signal, wherein reversing the forward-filtered digital signal generates a reverse-filtered digital signal; and
    filtering the reverse-filtered digital signal through the plurality of selectable filters, wherein filtering the reverse-filtered digital signal generates a processed signal.

2. The method of claim 1, wherein the input signal is transmitted periodically from a source for a transmission time, the method further comprising:
    disabling the amplifier, the filter, and the analog-to-digital converter after the transmission time of the input signal and after the third output is stored in the memory.

3. The method of claim 1, wherein the plurality of selectable filters includes an infinite impulse response filter.

4. The method of claim 1, further comprising:
    reprocessing the processed signal, wherein reprocessing the processed signal includes:
    filtering the processed signal through a plurality of selectable filters, wherein filtering the processed signal generates a second forward-filtered digital signal;
    storing the second forward-filtered digital signal in the memory;
    reversing the second forward-filtered digital signal, wherein reversing the second forward-filtered digital signal generates a second reverse-filtered digital signal; and
    filtering the second reverse-filtered digital signal through the plurality of selectable filters, wherein filtering the second reverse-filtered digital signal generates a reprocessed signal.

5. The method of claim 4, further comprising:
    recursively repeating the reprocessing step, wherein the recursively repeating the reprocessing step uses the reprocessed signal as the processed signal in the filtering the processed signal step.

6. The method of claim 5, wherein recursively repeating the reprocessing step occurs until a phase of the reprocessed signal is equal to a phase of the digital signal.

7. The method of claim 3, further comprising:
    minimizing a filter settling time of the processed signal.

8. The method of claim 7, wherein minimizing the filter settling time of the processed signal includes
    measuring a phase shift between the forward-filtered digital signal and the reversed-filtered digital signal;
    measuring a minimum Z register value and a maximum Z register value in the forward-filtered digital signal; and
    correcting the processed signal based on at least the minimum Z register value and the maximum Z register value.

9. The method of claim 8, wherein minimizing the filter settling time of the processed signal further includes:
    calculating Z delay register values from the minimum Z register value and the maximum Z register value; and
    utilizing the Z delay register values in the infinite impulse response filter before filtering the reverse-filtered digital signal through the plurality of selectable filters.

10. The method of claim 7, wherein the minimizing the filter settling time of the processed signal further includes applying a phase offset to a starting location of the filtering of the reversed-filtered digital signal.

11. A TPMS system comprising:
    an amplifier configured to receive an input signal and generate a first output, wherein the first output includes a higher signal level than a signal level of the input signal;
    a filter configured to receive the first output and generate a second output;
    an analog-to-digital converter configured to receive the second output and generate a third output;
    a memory configured to receive the third output, store the third output, and generate a digital signal; and
    a digital signal processor configured to receive the digital signal, filter the digital signal through a plurality of selectable filters to generate a forward-filtered digital signal, store the forward-filtered digital signal in the memory, reverse the forward-filtered digital signal to generate a reverse-filtered digital signal, filter the reverse-filtered digital signal through the plurality of selectable filters, and filter the reverse-filtered digital signal to generate a processed signal.

12. The TPMS system of claim 11, wherein the input signal is transmitted periodically from a source for a transmission time, wherein the amplifier, the filter, and the analog-to-digital converter are configured to be disabled after the transmission time of the input signal and after the third output is stored in the memory.

13. The TPMS system of claim 11, wherein the plurality of selectable filters includes an infinite impulse response filter.

14. The TPMS system of claim 11, wherein the digital signal processor is configured to reprocess the processed signal.

15. The TPMS system of claim 14, wherein the digital signal processor is configured to recursively reprocess the processed signal until a phase of the reprocessed signal is equal to a phase of the digital signal.

16. The TPMS system of claim 13, wherein the digital signal processor is configured to minimize a filter settling time of the processed signal.

17. The TPMS system of claim 16, wherein the digital signal processor is configured to measure properties of the digital signal and correct the infinite impulse response filter with at least Z delay register values before the reverse-filtered digital signal is filtered through the plurality of selectable filters calculate, wherein the Z delay register values includes a minimum Z register value and a maximum Z register value.

18. The TPMS system of claim 17, wherein the digital signal processor is configured to apply a phase offset to a starting location of the reversed-filtered digital signal.

19. A method associated with a tire pressure monitoring system ("TPMS"), comprising:
- receiving an input signal;
- storing the input signal in a memory;
- receiving a digital signal from the memory at a digital signal processor, wherein the digital signal processor includes a plurality of selectable filters;
- filtering the digital signal through a plurality of selectable filters, wherein filtering the digital signal generates a processed signal; and
- minimizing a filter settling time of the processed signal.

20. The method of claim 19, wherein the minimizing the filter settling time of the processed signal includes
- measuring a phase shift between a forward-filtered digital signal and a reversed-filtered digital signal,
- measuring a minimum Z register value and a maximum Z register value in the forward-filtered digital signal, and
- correcting the processed signal based on at least the minimum Z register value, the maximum Z register value, and the phase shift.

* * * * *